US010887584B2

(12) United States Patent
Zhang et al.

(10) Patent No.: US 10,887,584 B2
(45) Date of Patent: Jan. 5, 2021

(54) NAKED-EYE THREE-DIMENSIONAL DISPLAY DEVICE AND CONTROL METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Liang Zhang, Beijing (CN); Zongze He, Beijing (CN); Zhiming Meng, Beijing (CN); Jianguang Yang, Beijing (CN); Shuo Li, Beijing (CN); Zhipeng Feng, Beijing (CN); Zhenghua Lu, Beijing (CN); Yuxuan Chen, Beijing (CN); Feng Long, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 219 days.

(21) Appl. No.: 16/019,957

(22) Filed: Jun. 27, 2018

(65) Prior Publication Data

US 2019/0037210 A1    Jan. 31, 2019

(30) Foreign Application Priority Data

Jul. 31, 2017 (CN) .......................... 2017 1 0645661

(51) Int. Cl.
*H04N 13/398* (2018.01)
*H04N 13/302* (2018.01)
(Continued)

(52) U.S. Cl.
CPC ............. *H04N 13/398* (2018.05); *G02F 1/29* (2013.01); *H04N 13/302* (2018.05);
(Continued)

(58) Field of Classification Search
CPC ......... G02F 1/29; G02F 2201/30; G06T 7/50; G06T 7/70; G06T 15/00; H04N 13/302;
(Continued)

(56) References Cited

U.S. PATENT DOCUMENTS 5,712,732 A * 1/1998 Street .................... H04N 13/31
359/630
5,777,720 A * 7/1998 Shapiro .................. G02B 30/27
351/237

(Continued)

FOREIGN PATENT DOCUMENTS

WO    WO-2017114839 A1 *  7/2017 ........... H04N 13/368

*Primary Examiner* — Daniel Chang
(74) *Attorney, Agent, or Firm* — Dilworth & Barrese, LLP.; Michael J. Musella, Esq.

(57) ABSTRACT

A naked-eye three-dimensional display device includes a display panel, a liquid crystal grating, a processor and an image collector, wherein, the image collector is configured to obtain first current viewing information and second current viewing information, and send the same to the processor; the processor is configured to receive and store the first and second current viewing information, adjust a width and/or a position of a light transmitting region of the liquid crystal grating according to the first current viewing information, and adjust an output picture of the display panel, according to the second current, viewing information and the width and/or the position of the light transmitting region of the liquid crystal grating adjusted.

17 Claims, 4 Drawing Sheets

(51) Int. Cl.
*H04N 13/368* (2018.01)
*G02F 1/29* (2006.01)
*H04N 13/376* (2018.01)
*H04N 13/373* (2018.01)
*H04N 13/31* (2018.01)
*G06T 7/70* (2017.01)
*G06T 7/50* (2017.01)

(52) U.S. Cl.
CPC ........... *H04N 13/31* (2018.05); *H04N 13/368* (2018.05); *H04N 13/373* (2018.05); *H04N 13/376* (2018.05); *G02F 2201/30* (2013.01); *G06T 7/50* (2017.01); *G06T 7/70* (2017.01); *G06T 2207/30201* (2013.01)

(58) Field of Classification Search
CPC .... H04N 13/31; H04N 13/368; H04N 13/373; H04N 13/376; H04N 13/398; H04N 13/305; H04N 13/351; H04N 13/383; H04N 13/366; H04N 2013/405; H04N 13/161; H04N 13/229; G02B 30/27; G02B 6/00; G02B 27/0093; G02B 30/26; G02B 30/24; G09G 5/14; G09G 2320/0209; G09G 2320/068; G06F 3/013
USPC .................. 348/59, 54, 43, 51, 46, 564, 42; 345/419, 156, 204, 6; 359/463; 349/15
See application file for complete search history.

(56) References Cited

U.S. PATENT DOCUMENTS

| | | | | |
|---|---|---|---|---|
| 6,008,484 A * | 12/1999 | Woodgate | ............ | H04N 13/376 250/201.1 |
| 8,248,462 B2 * | 8/2012 | Peterka | .............. | G02B 27/0093 348/54 |
| 9,030,532 B2 * | 5/2015 | Starkweather | ....... | H04N 13/378 348/51 |
| 9,520,106 B2 * | 12/2016 | An | ........................... | G09G 5/14 |
| 9,648,308 B2 * | 5/2017 | Hinnen | ................ | H04N 13/183 |
| 10,241,569 B2 * | 3/2019 | Lanman | ............. | G02B 27/0172 |
| 10,429,647 B2 * | 10/2019 | Gollier | .................... | G06F 3/013 |
| 2003/0025995 A1 * | 2/2003 | Redert | .................... | H04N 13/32 359/464 |
| 2006/0139447 A1 * | 6/2006 | Unkrich | ................. | H04N 13/31 348/51 |
| 2007/0182812 A1 * | 8/2007 | Ritchey | .................. | H04N 5/232 348/36 |
| 2011/0157167 A1 * | 6/2011 | Bennett | ..................... | G06F 3/14 345/419 |
| 2011/0261169 A1 * | 10/2011 | Tin | ....................... | H04N 13/133 348/51 |
| 2013/0169529 A1 * | 7/2013 | Ek | ........................ | H04N 13/398 345/156 |
| 2013/0307948 A1 * | 11/2013 | Odake | ..................... | H04N 13/368 348/59 |
| 2014/0091991 A1 * | 4/2014 | An | ........................... | G09G 5/14 345/32 |
| 2014/0125893 A1 * | 5/2014 | Wu | ..................... | G02F 1/13394 349/15 |
| 2014/0307068 A1 * | 10/2014 | Song | .................... | H04N 13/368 348/54 |
| 2015/0049176 A1 * | 2/2015 | Hinnen | ................. | H04N 13/351 348/59 |
| 2015/0286062 A1 * | 10/2015 | Zheng | .................... | G02B 30/27 349/57 |
| 2015/0346498 A1 * | 12/2015 | Zhong | ............... | G02F 1/133528 349/61 |
| 2016/0033777 A1 * | 2/2016 | Lin | .......................... | G02F 1/29 349/33 |
| 2016/0049120 A1 * | 2/2016 | Zhu | ....................... | G09G 3/36 345/690 |
| 2016/0050410 A1 * | 2/2016 | Oh | ....................... | H04N 13/366 348/51 |
| 2016/0065950 A1 * | 3/2016 | Quan | .................... | G02B 30/27 348/51 |
| 2016/0073097 A1 * | 3/2016 | Hamagishi | ........... | H04N 13/305 348/59 |
| 2016/0189639 A1 * | 6/2016 | Liao | ........................ | G09G 3/36 345/102 |
| 2016/0360187 A1 * | 12/2016 | Smithwick | .............. | G06T 19/20 |
| 2017/0353716 A1 * | 12/2017 | Shin | ...................... | H04N 13/327 |
| 2018/0376134 A1 * | 12/2018 | Koerber | ............... | H04N 13/376 |

* cited by examiner

NAKED-EYE THREE-DIMENSIONAL DISPLAY DEVICE AND CONTROL METHOD THEREOF

TECHNICAL FIELD

The present disclosure relates to a naked-eye three-dimensional display device and a control method thereof.

BACKGROUND

A working principle of a three-dimensional (3D) display technology is that: with respect to a same scene, the left eye and the right eye of a viewer are made to respectively receive an image, and a spacing between both eyes of the viewer in a horizontal direction (i.e., a pupil distance, about 65 mm) makes subtle difference in a viewing angle of both eyes; due to existence of such difference, images respectively observed by the left eye and the right eye of the viewer are also slightly different, the difference is referred to "binocular parallax", the images with the difference observed by the left eye and the right eye constitute a "stereoscopic image pair", and the "stereoscopic image pair", as fused by a brain visual cortex, achieves a stereoscopic effect.

Currently, when viewing with a stereoscopic display device, the viewer needs to wear stereoscopic spectacles; since a size of the stereoscopic spectacles is usually fixed, viewers with different face shapes may not be able to obtain better user experience when viewing with the stereoscopic glasses; in addition, with respect to a viewer who originally wears spectacles (for example, near-sighted spectacles, far-sighted spectacles, etc.), in order to obtain a stereoscopic viewing effect, he/she needs to overlap two pairs of spectacles, which is inconvenient to use and reduces the user experience. Therefore, a naked-eye 3D technology that implements stereoscopic display without help of an auxiliary tool emerges as the times require.

With development of the naked-eye 3D technology, naked-eye 3D display devices are also widely used. At present, at the time of shipment of an existing naked-eye 3D display product, correspondence between position coordinates of a first viewer and a second viewer and a viewpoint is already determined, that is, a viewing position corresponding to the viewpoint is determined.

SUMMARY

Embodiments of the present disclosure provide a naked-eye three-dimensional display device and a control method thereof, which can realize an effect of no crosstalk and well anti-peeping, when the position of the viewer changes.

At one aspect, an embodiment of the present disclosure provides a naked-eye three-dimensional display device, which comprises: a display panel, a liquid crystal grating, a processor and an image collector, wherein, the display panel is configured to output a picture; the liquid crystal grating, provided between the display panel and a viewer, is configured to separate light from the display panel; the image collector, connected with the processor, is configured to obtain first current viewing information and second current viewing information, and send the first current viewing information and the second current viewing information to the processor; the first current viewing information including position information and binocular pupil distance information of a first viewer at a current moment, and the second current viewing information including position information and binocular pupil distance information of a second viewer at the current moment; the processor, connected with the display panel and the liquid crystal grating, is configured to receive the first current viewing information and the second current viewing information sent by the image collector and store the first current viewing information and the second current viewing information, adjust a width and/or a position of a light transmitting region of the liquid crystal grating according to the first current viewing information, and adjust an output picture of the display panel, according to the second current viewing information and the width and/or the position of the light transmitting region of the liquid crystal grating adjusted.

At second aspect, an embodiment of the present disclosure provides a control method of a naked-eye three-dimensional display device, the naked-eye three-dimensional display device comprising a display panel, a liquid crystal grating, a processor and an image collector, the control method comprises: obtaining, by the image collector, first current viewing information and second current viewing information, and sending the first current viewing information and the second current viewing information to the processor; the first current viewing information including position information and binocular pupil distance information of a first viewer at a current moment, and the second current viewing information including position information and binocular pupil distance information of a second viewer at the current moment; receiving, by the processor, the first current viewing information and the second current viewing information sent by the image collector and storing the first current viewing information and the second current viewing information, adjusting a width and/or a position of a light transmitting region of the liquid crystal grating according to the first current viewing information, and adjusting an output picture of the display panel, according to the second current viewing information and the width and/or the position of the light transmitting region of the liquid crystal grating adjusted.

BRIEF DESCRIPTION OF THE DRAWINGS

The drawings are used for providing further understanding of the technical solutions of the present disclosure, and constitute a part of the specification, which, together with the embodiments of the present application, are used for explaining the technical solutions of the present disclosure, but do not constitute limitation to the technical solutions of the present disclosure.

REFERENCE SIGNS

201—display panel; 202—liquid crystal grating; 202'—liquid crystal grating;
300—electrode region; 301—light transmitting region; 302—non-light transmitting region;
303—first liquid crystal grating 304—second liquid crystal grating P1—first viewer; row; row;
P2—second viewer.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, such as "connect/connecting/connected," "couple/coupling/coupled" or the like, are not limited to a physical connection or mechanical connection, but may include an electrical connection/coupling, directly or indirectly. The terms, "on," "under," or the like are only used to indicate relative position relationship, and when the position of the object which is described is changed, the relative position relationship may be changed accordingly.

Figure 1:
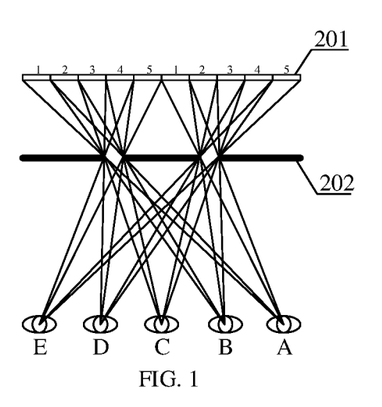
FIG. 1 is a schematic diagram of a case that human eyes at different positions correspond to different viewpoints.

At present, an existing naked-eye three-dimensional display device divides an image of a display panel into different portions according to space through a grating in front of the display panel, a good three-dimensional effect may only be achieved by observation at a fixed position. FIG. 1 is a schematic diagram of human eyes at different positions corresponding to different viewpoints. As shown in FIG. 1, a liquid crystal grating 202 in front of a display panel 201 divides an image on the display panel into different portions according to space, and according to different viewpoint positions of the human eyes, i.e., a viewpoint position A to a viewpoint position E, by a viewing effect of the liquid crystal grating 202, the display panel 201 is divided into five viewpoints 1 to 5. If a position of the human eyes with respect to the liquid crystal grating 202 can be determined, then two viewpoints seen by both eyes of the viewer may be determined. For example, when both eyes of the viewer are respectively located at the viewpoint position E and the viewpoint position D, the viewer can see images displayed by the viewpoint 5 and the viewpoint 4, and based on a binocular parallax principle, when the viewpoint 5 and the viewpoint 4 display a naked-eye three-dimensional image that the viewer needs to see, the viewer can see the three-dimensional image. However, the inventor of the present application finds by research that, with respect to the existing naked-eye 3D display device, when a viewing position of the viewer changes, a position corresponding to the eye of the viewer changes, and a viewpoint corresponding to the eye of the viewer also changes; in this way, a viewpoint interference region will be generated, causing image crosstalk, so that the viewer is unable to continue to see a better three-dimensional picture, and at a same time, anti-peeping between two viewers cannot be implemented.

In order to overcome the problems of 3D image crosstalk caused by the change of the position of the viewer and inability to implement anti-peeping, embodiments of the present disclosure provide a naked-eye three-dimensional display device and a control method thereof.

Figure 2:
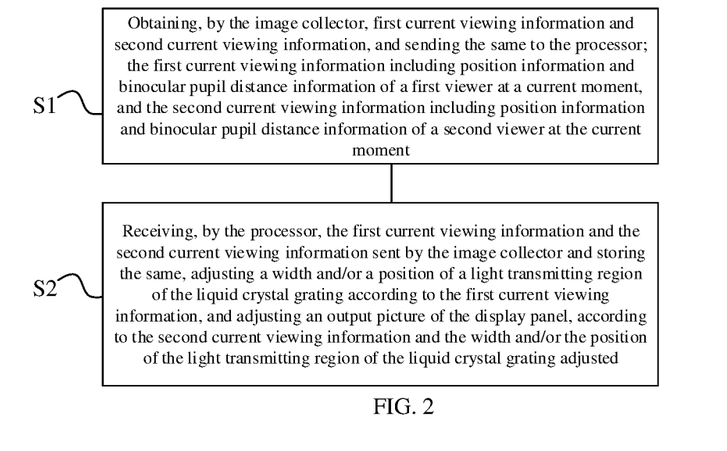
FIG. 2 is a flow chart of a naked-eye three-dimensional display control method according to an embodiment of the present disclosure.

Some embodiments of the present disclosure provide a control method of a naked-eye three-dimensional display device, the naked-eye three-dimensional display device comprises a display panel, a liquid crystal grating, a processor and an image collector. FIG. 2 is a flow chart of the control method of the naked-eye three-dimensional display device according to the embodiment of the present disclosure, comprising:

S1: obtaining, by the image collector, first current viewing information and second current viewing information, and sending the same to the processor; the first current viewing information including position information and binocular pupil distance information of a first viewer at a current moment, and the second current viewing information including position information and binocular pupil distance information of a second viewer at the current moment;

S2: receiving, by the processor, the first current viewing information and the second current viewing information sent by the image collector and storing the same, adjusting a width and/or a position of a light transmitting region of the liquid crystal grating according to the first current viewing information, and adjusting an output picture of the display panel, according to the second current viewing information and the width and/or the position of the light transmitting region of the liquid crystal grating adjusted.

In the control method of the naked-eye three-dimensional display device provided by the embodiment of the present disclosure, by obtaining the first current viewing information and the second current viewing information, adjusting the width and/or the position of the light transmitting region of the liquid crystal grating according to the first current viewing information, and adjusting the output picture of the display panel, according to the second current viewing information and the width and/or the position of the light transmitting region of the liquid crystal grating adjusted, crosstalk does not occur to the 3D image seen by the viewer, when the position of the viewer changes, so as to obtain a better viewing effect, and to well implement anti-peeping.

In this embodiment, the obtaining, by image collector, first current viewing information and second current viewing information, and sending the same to the processor, may specifically include:

Collecting, by the image collector, face images of the first viewer and the second viewer, respectively;

Processing the face images of the first viewer and the second viewer, respectively, to obtain the first current viewing information of the first viewer and the second current viewing information of the second viewer, the first current viewing information including the position information and the binocular pupil distance information of the first viewer at the current moment, and the second current viewing information including the position information and the binocular pupil distance information of the second viewer at the current moment.

Figure 3:
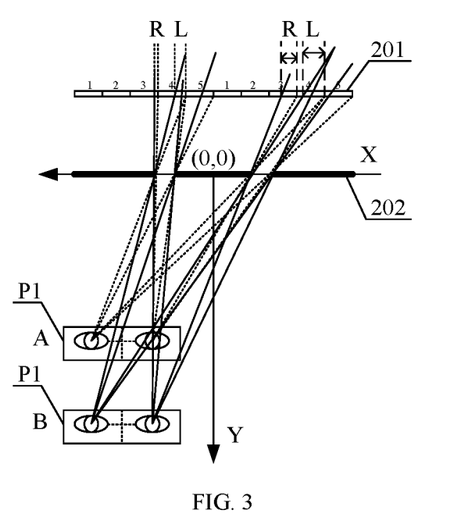
FIG. 3 is a schematic diagram of a viewpoint interference region generated after a position of a first viewer changes according to the embodiment of the present disclosure.

As shown in FIG. 3, a viewer P1 moves from a position A at a previous moment to a position B at the current moment, at this time, crosstalk may occur to an image on a display panel 201 seen by the viewer P1 through the liquid crystal grating 202 due to change of the position. At this time, the image collector collects the face image of the viewer at the position B; the face image may be collected by a face recognition device, for example, a camera, and the like; and the face recognition device may implement real-time tracking the face image, and may further collect the face image in real time.

Then, the collected face image at the position B is processed, to obtain position information and binocular pupil distance information of the viewer P1 at the position B. The face image may be processed with a preset image processing module or by using other processing methods, to obtain the position information and the binocular pupil distance information of the viewer. In FIG. 3, a position where the liquid crystal grating 202 is located may be set as an X-axis, a center point of the liquid crystal grating 202 is a coordinate origin (0, 0), and a direction perpendicular to the X-axis is set as a Y-axis. When the viewer P1 moves from the position A to the position B, the face image of the viewer P1 is collected and processed, to obtain coordinates $(X_1, Y_1)$ of the position B, and obtain the binocular pupil distance information of the viewer P1.

In the embodiment of the present disclosure, the adjusting a width and/or a position of a light transmitting region of the liquid crystal grating according to the first current viewing information, and adjusting an output picture of the display panel, according to the second current viewing information and the width and/or the position of the light transmitting region of the liquid crystal grating adjusted, includes:

Determining a first current viewpoint corresponding to the first current viewing information;

Determining a viewpoint interference region of the first viewer according to the first current viewpoint, adjusting the width and/or the position of the light transmitting region of the liquid crystal grating according to the viewpoint interference region, and removing the viewpoint interference region from a viewing position of the first viewer;

Determining a second current viewpoint corresponding to the second current viewing information according to the width and/or the position of the light transmitting region of the liquid crystal grating adjusted, and adjusting the output picture of the display panel, according to the second current viewpoint.

In the embodiment of the present disclosure, the determining a viewpoint interference region of the first viewer according to the first current viewpoint, adjusting the width and/or the position of the light transmitting region of the liquid crystal grating according to the viewpoint interference region, and removing the viewpoint interference region from a viewing position of the first viewer, specifically includes:

Reading first previous viewing information, the first previous viewing information being viewing information of the first viewer at the previous moment, and determining a first previous viewpoint corresponding to the first previous viewing information;

Comparing the first current viewpoint with the first previous viewpoint, and determining the viewpoint interference region of the first viewer;

Adjusting the width and/or the position of the light transmitting region of the liquid crystal grating according to the first current viewing information and the viewpoint interference region, and removing the viewpoint interference region from the viewing position of the first viewer.

For example, the comparing the first current viewpoint with the first previous viewpoint, and determining the viewpoint interference region of the first viewer may comprises: comparing the first current viewpoint with the first previous viewpoint, and determining whether the viewpoint interference region of the first viewer exists.

The determining a first current viewpoint corresponding to the first current viewing information, is specifically embodied as that: in FIG. 3, current position coordinates of the first viewer P1 are $(X_1, Y_1)$, and a viewpoint corresponding to the coordinates $(X_1, Y_1)$ of the position B may be determined by looking up a Table of Relationship between Position Coordinates and Viewpoints. Usually, the Table of Relationship between Position Coordinates and Viewpoints is preset at the time of shipment of the product, as shown in Table 1. From Table 1, it can be found that a viewpoint corresponding to the current position $(X_1, Y_1)$ of the viewer P1 is $(SZ_1, SY_1)$.

TABLE 1

Table of Relationship between Position Coordinates and Viewpoints

| Y | X | | | | |
|---|---|---|---|---|---|
|  | −20 | −10 | 0 | 10 | 20 |
| 10 | 2.3 | 4.5 | — | 1.2 | 1.5 |
| 20 | 1.5 | 1.2 | — | 4.5 | 2.3 |
| 30 | 2.3 | 4.5 | — | 1.2 | 1.5 |
| 40 | 1.5 | 1.2 | — | 4.5 | 2.3 |
| 50 | 2.3 | 4.5 | — | 1.2 | 1.5 |

The reading first previous viewing information, the first previous viewing information being viewing information of the first viewer at a previous moment, and determining a first previous viewpoint corresponding to the first previous viewing information, is specifically embodied as: in FIG. 3, reading viewing information of the first viewer P1 at the position A at the previous moment, position coordinates corresponding to the position A are $(X_0, Y_0)$, and finding the viewpoint $(SZ_0, SY_0)$ corresponding to the coordinates $(X_0, Y_0)$ at the position A at the previous moment from Table 1, that is, determining the first previous viewpoint $(SZ_0, SY_0)$ corresponding to the first previous viewing information.

The comparing the first current viewpoint with the first previous viewpoint, and determining the viewpoint interference region of the first viewer, is specifically embodied as: comparing the viewpoint corresponding to the position B with the viewpoint corresponding to the position A, wherein, the viewpoint corresponding to the position B is different from the viewpoint corresponding to the position A, and with respect to the liquid crystal grating at the previous moment, when the first viewer P1 moves to the position B, the viewpoint of the first viewer P1 changes, so it is possible to determine that after the first viewer P1 moves from the position A to the position B, there must be a viewpoint interference region. In FIG. 3, a solid line indicates a viewpoint range when the first viewer P1 is at the position B, and a dotted line indicates a viewpoint range when the first viewer is at the position A. With respect to a right eye of the first viewer, the viewpoint range of the right eye when the first viewer is at the position A is "4", and a viewpoint range of the right eye when at the position B is "a portion of 3+a portion of 4". With respect to a left eye of the first viewer, a viewpoint range of the left eye when the first viewer is at the position A is "5", and a viewpoint range of the left eye when at the position B is "a portion of 4+a portion of 5". By comparing the viewpoint range at the position B with the viewpoint range at the position A, it is possible to obtain a viewpoint interference region L of the left eye and a viewpoint interference region R of the right eye, when the first viewer is at the position B.

In the embodiment of the present disclosure, the adjusting the width and/or the position of the light transmitting region of the liquid crystal grating according to the first current viewing information and the viewpoint interference region, and removing the viewpoint interference region from the viewing position of the first viewer, includes:

Obtaining a center-to-center spacing between two adjacent light transmitting regions of the liquid crystal grating, according to the first current viewing information;

Calculating a width and/or a position of an ideal light transmitting region corresponding to the first current viewing information, according to the center-to-center spacing and the viewpoint interference region;

Adjusting the width and/or the position of the light transmitting region of the liquid crystal grating according to the width and/or the position of the ideal light transmitting region, and removing the viewpoint interference region from the viewing position of the first viewer.

For example, the calculating a width and/or a position of an ideal light transmitting region corresponding to the first current viewing information, according to the center-to-center spacing and the viewpoint interference region may comprises: under a condition that the viewpoint interference region exists, calculating a width and/or a position of an ideal light transmitting region corresponding to the first current viewing information according to the first current viewing information and/or the center-to-center spacing.

Wherein, the obtaining a center-to-center spacing between two adjacent light transmitting regions of the liquid crystal grating, according to the first current viewing information, is specifically embodied as that: the center-to-center spacing between the two adjacent light transmitting regions of the liquid crystal grating may be obtained by a formula bellow:

$$\frac{f}{n*p} = \frac{r}{r+d}$$

Where, f is the center-to-center spacing between the two adjacent light transmitting regions of the liquid crystal grating, n is the number of pixel points of the display panel, p is a sub-pixel width of the display panel, d is a distance between the liquid crystal grating and the display panel, and r is a distance between the viewer and the liquid crystal grating.

Figure 4:
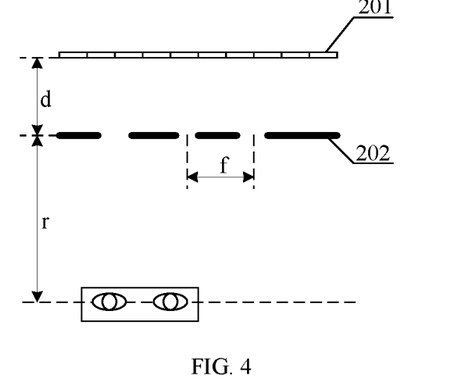
FIG. 4 is a schematic diagram of positions of the first viewer, a liquid crystal grating and a display panel.

FIG. 4 shows specific meaning of respective parameters in the above-described formula, f is a center-to-center spacing between two adjacent light transmitting regions of the liquid crystal grating 202, d is a distance between the liquid crystal grating 202 and the display panel 201, and r is a distance between the viewer and the liquid crystal grating 202, where, n and p may be obtained from parameters of the display panel 201.

The calculating a width and/or a position of an ideal light transmitting region corresponding to the first current viewing information, according to the center-to-center spacing and the viewpoint interference region, is specifically embodied as: determining a width and/or a position of an ideal light transmitting region corresponding to both eyes of the first viewer at a current viewing position, according to the center-to-center spacing and the viewpoint interference region obtained.

The adjusting the width and/or the position of the light transmitting region of the liquid crystal grating according to the width and/or the position of the ideal light transmitting region, and removing the viewpoint interference region from the viewing position of the first viewer, is specifically embodied as: adjusting a width and/or a position of the liquid crystal grating, after obtaining the width and/or the position of the ideal light transmitting region, and removing the viewpoint interference region from the viewing position.

Figure 5:
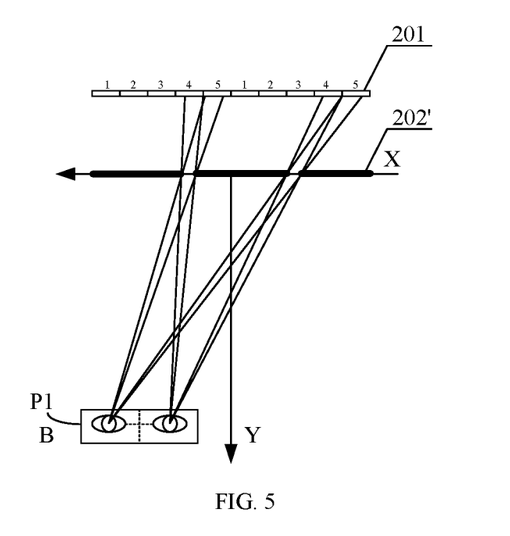
FIG. 5 is a schematic diagram of a viewpoint corresponding to the first viewer at a current position according to the embodiment of the present disclosure.

FIG. 3 shows viewpoint interference regions, i.e., a region L and a region R, respectively corresponding to the left eye and the right eye of the first viewer, the width and/or the position of the liquid crystal grating is adjusted according to the region L and the region R as well as the center-to-center spacing, and the region L and the region R are respectively made to locate outside the viewing position, so that the viewer's left eye may only see the viewpoint 5, and the right eye may only see the viewpoint 4. FIG. 5 is a schematic diagram of the liquid crystal grating adjusted, showing a liquid crystal grating 202' adjusted according to the width and/or the position of the ideal light transmitting region. By adjusting the liquid crystal grating, the first viewer P1 may only see the viewpoint 4 and the viewpoint 5 at the position B, so a better three-dimensional image effect may be achieved for the first viewer.

Figure 6A:
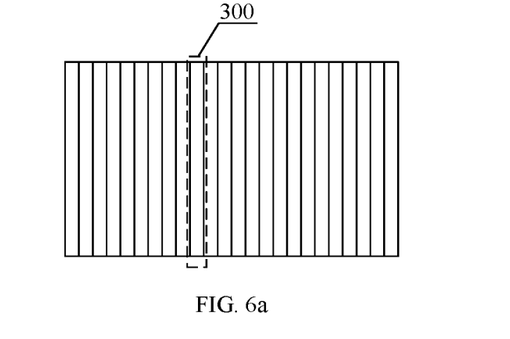
FIG. 6a to FIG. 6c are schematic diagrams of a liquid crystal grating adjusting a light transmitting region.
Figure 6B:
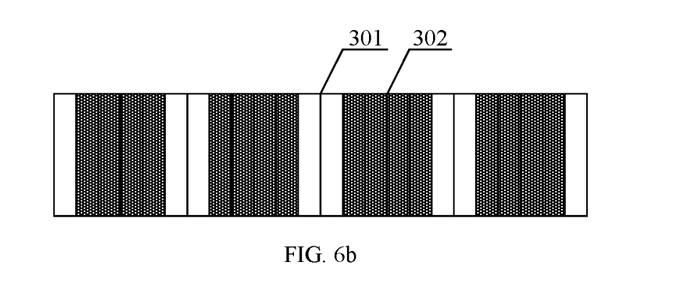
Figure 6C:
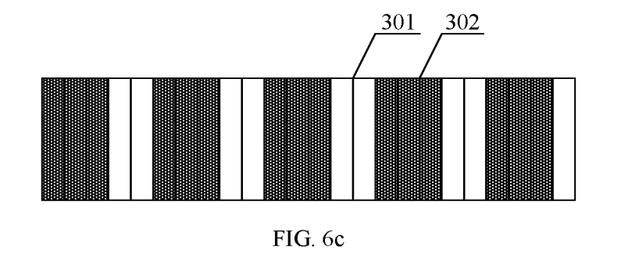

FIG. 6a shows a structural schematic diagram of the liquid crystal grating in this embodiment. The liquid crystal grating includes a plurality of extremely small electrode regions 300; each electrode region 300 may be separately charged, to control liquid crystal deflection within the present region to form a grating. FIG. 6b is a schematic diagram of the grating formed by the liquid crystal deflection within the electrode region 300, and the liquid crystal grating includes a light transmitting region 301 and a non-light transmitting region 302. When the position of the viewer changes, a width and/or a position of the light transmitting region 301 and/or the non-light transmitting region 302 are adjusted according to the center-to-center spacing and the viewpoint interference region obtained; FIG. 6c is a schematic diagram of the liquid crystal grating adjusted; by comparing FIG. 6b with FIG. 6c, it can be seen that, in order to locate a viewpoint overlapping region outside the viewing position, the positions and the widths of the light transmitting region 301 and the non-light transmitting region 302 change.

In the embodiment of the present disclosure, the determining a second current viewpoint corresponding to the second current viewing information according to the width and/or the position of the light transmitting region of the liquid crystal grating adjusted, and adjusting the output picture of the display panel, according to the second current viewpoint, includes:

Reading second previous viewing information, the second previous viewing information being viewing information of the second viewer at the previous moment, and determining a second previous viewpoint corresponding to the second previous viewing information;

Determining the second current viewpoint corresponding to the second current viewing information, according to the second current viewing information and the width and/or the position of the light transmitting region of the liquid crystal grating adjusted;

Adjusting the output picture of the display panel, according to the second current viewpoint and the second previous viewpoint, and outputting a picture corresponding to the second previous viewpoint at the second current viewpoint position of the display panel.

The image collector obtains the second current viewing information, and the second current viewing information includes position coordinates $(X_1', Y_1')$ of the second viewer at the current moment.

The second previous viewing information is read, the second previous viewing information includes second previous position coordinates $(X_0', Y_0')$, and by looking up Table 1, the second previous viewpoint $(SX_0', SY_0')$ corresponding to the second previous position coordinates $(X_0', Y_0')$ is obtained. According to the position coordinates $(X_1', Y_1')$ of the second viewer at the current moment, the binocular pupil distance of the second viewer in the second current viewing information, and the width and/or the position of the light transmitting region of the liquid crystal grating adjusted, a second current viewpoint $(SX_1', SY_1')$ corresponding to the second current viewing information is determined. According to the second current viewpoint $(SX_1', SY_1')$ and the second previous viewpoint $(SX_0', SY_0')$, the output picture of the display panel is adjusted, and a picture corresponding to the second previous viewpoint $(SX_0', SY_0')$ is output at a position of the second current viewpoint $(SX_1', SY_1')$ of the display panel. Thus, when the position of the second viewer changes, a better three-dimensional picture may be seen as well; in addition, in this way, it also prevents the second viewer and the first viewer from simultaneously seeing a same viewpoint, so as to implement anti-peeping between the second viewer and the first viewer.

Figure 7:
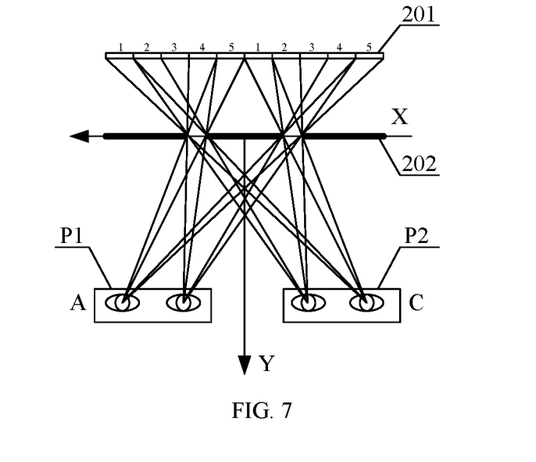
FIG. 7 is a schematic diagram of viewpoints corresponding to two viewers according to the embodiment of the present disclosure.

FIG. 7 is a schematic diagram of viewpoints corresponding to two viewers according to the embodiment of the present disclosure. In FIG. 7, a viewpoint corresponding to the second viewer P2 is (1, 2). When the first viewer P1 moves from the position A to the position B, as shown in FIG. 3, the width and/or the position of the liquid crystal grating change. As shown in FIG. 5, the adjusted liquid crystal grating is 202'. At this time, the second viewer P2 moves from a position C at the previous moment to the position $(X_1', Y_1')$ at the current moment, and with respect to the adjusted liquid crystal grating 202', the second current viewpoint of the second viewer is $(SX_1', SY_1')$, then, the display panel is adjusted, so that the viewpoint $SX_1'$ of the display panel outputs a picture corresponding to the viewpoint 1, and the viewpoint $SY_1'$ outputs a picture corresponding to the viewpoint 2.

Figure 8:
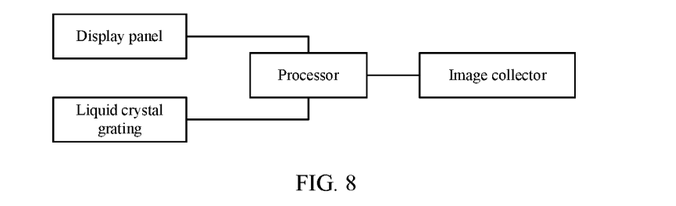
FIG. 8 is a schematic diagram of a naked-eye three-dimensional display device according to an embodiment of the present disclosure.

Based on a technical concept of the foregoing embodiment, some embodiments of the present disclosure further propose a naked-eye three-dimensional display device. FIG. 8 is a schematic diagram of the naked-eye three-dimensional display device according to the embodiment of the present disclosure. The device comprises a display panel, a liquid crystal grating, a processor and an image collector, wherein, The display panel is configured to output a picture;

The liquid crystal grating, provided between the display panel and a viewer, is configured to separate light from the display panel, for example, separate pictures visible to both eyes of the viewer;

The image collector, connected with the processor, is configured to obtain first current viewing information and second current viewing information, and send the same to the processor; the first current viewing information including position information and binocular pupil distance information of a first viewer at a current moment, and the second current viewing information including position information and binocular pupil distance information of a second viewer at the current moment;

The processor, connected with the display panel and the liquid crystal grating, is configured to receive the first current viewing information and the second current viewing information sent by the image collector and store the same, adjust a width and/or a position of a light transmitting region of the liquid crystal grating according to the first current viewing information, and adjust an output picture of the display panel, according to the second current viewing information and the width and/or the position of the light transmitting region of the liquid crystal grating adjusted.

The processor includes:

A determining module, configured to determine a first current viewpoint corresponding to the first current viewing information;

A first control module, configured to determine a viewpoint interference region of the first viewer according to the first current viewpoint, adjust the width and/or the position of the light transmitting region of the liquid crystal grating according to the viewpoint interference region to locate the viewpoint interference region outside a viewing position of the first viewer;

A second control module, configured to determine a second current viewpoint corresponding to the second current viewing information according to the width and/or the position of the light transmitting region of the liquid crystal grating adjusted, and adjust the output picture of the display panel, according to the second current viewpoint.

The first control module includes:

A first acquiring unit, configured to read first previous viewing information, the first previous viewing information being viewing information of the first viewer at a previous moment, and determine a first previous viewpoint corresponding to the first previous viewing information;

A first determining unit, configured to compare the first current viewpoint with the first previous viewpoint, and determine the viewpoint interference region of the first viewer;

A first controller, configured to adjust the width and/or the position of the light transmitting region of the liquid crystal grating according to the first current viewing information and the viewpoint interference region to locate the viewpoint interference region outside the viewing position of the first viewer.

For example, the first determining unit may be configured to compare the first current viewpoint with the first previous viewpoint and determine whether the viewpoint interference region of the first viewer exists.

The first controller includes:

A first sub-calculator, configured to obtain a center-to-center spacing between two adjacent light transmitting regions of the liquid crystal grating, according to the first current viewing information; calculate a width and/or a position of an ideal light transmitting region corresponding to the first current viewing information, according to the center-to-center spacing and the viewpoint interference region;

A first sub-controller, configured to adjust the width and/or the position of the light transmitting region of the liquid crystal grating according to the width and/or the position of the ideal light transmitting region to locate the viewpoint interference region outside the viewing position of the first viewer.

For example, the first sub-calculator may configured to obtain a center-to-center spacing between two adjacent light transmitting regions of the liquid crystal grating, according to the first current viewing information; under a condition that the viewpoint interference region of the first viewer exists, calculate a width and/or a position of an ideal light transmitting region corresponding to the first current viewing information, according to the first current viewing information and/or the center-to-center spacing.

The second control module includes:

A second acquiring unit, configured to read second previous viewing information, the second previous viewing information being viewing information of the second viewer at the previous moment, and determine a second previous viewpoint corresponding to the second previous viewing information;

A second determining unit, configured to determine the second current viewpoint corresponding to the second current viewing information, according to the second current viewing information and the width and/or the position of the light transmitting region of the liquid crystal grating adjusted;

A second controller, configured to adjust the output picture of the display panel, according to the second current viewpoint and the second previous viewpoint, and output a picture corresponding to the second previous viewpoint at the second current viewpoint position of the display panel.

In the embodiment of the present disclosure, the image collector includes: an image collecting module, configured to collect face images of the first viewer and the second viewer; an image processing module, configured to process the face images of the first viewer and the second viewer, to obtain the first current viewing information and the second current viewing information. The face image may be collected by a face recognition device, for example, a camera, and the like, and the face recognition device may implement real-time tracking the face image, and may further collect the face image in real time.

In the embodiment of the present disclosure, the determining module is configured to: determine current position coordinates of the first viewer according to the first current viewing information; and determine a viewpoint corresponding to the current position coordinates of the first viewer by looking up a Table of Relationship between Position Coordinates and Viewpoints.

In the embodiment of the present disclosure, the first acquiring unit is configured to: determine position coordinates of the first viewer at the previous moment according to the first previous viewing information; and determine a viewpoint corresponding to the position coordinates of the first viewer at the previous moment by looking up the Table of Relationship between Position Coordinates and Viewpoints.

In the embodiment of the present disclosure, the display device further comprises: a storing module, configured to store the Table of Relationship between Position Coordinates and Viewpoints.

The embodiments of the present disclosure provide the naked-eye three-dimensional display device and the control method thereof, by obtaining the first current viewing information and the second current viewing information, adjusting the width and/or the position of the light transmitting region of the liquid crystal grating according to the first current viewing information, and adjusting the output picture of the display panel, according to the second current viewing information and the width and/or the position of the light transmitting region of the liquid crystal grating adjusted, crosstalk does not occur to the 3D image seen by the viewer, when the position of the viewer changes, so as to obtain a better viewing effect. At a same time, the embodiments of the present disclosure well implement the anti-peeping function.

What are described above is related to the specific embodiments of the disclosure only and not limitative to the scope of the disclosure. The protection scope of the disclosure shall be based on the protection scope of the claims.

The application claims priority to the Chinese patent application No. 201710645661.3, filed Jul. 31, 2017, the disclosure of which is incorporated herein by reference as part of the application.

The invention claimed is:

1. A naked-eye three-dimensional display device, comprising a display panel, a liquid crystal grating, a processor and an image collector; wherein,
    the display panel is configured to output a picture;
    the liquid crystal grating, provided between the display panel and a viewer, is configured to separate light from the display panel;
    the image collector, connected with the processor; configured to obtain first current viewing information, second previous viewing information and second current viewing information, and send the first current viewing information, the second previous viewing information and the second current viewing information to the processor; the first current viewing information including position information and binocular pupil distance information of a first viewer at a current moment; the second previous viewing information including position information and binocular pupil distance information of a second viewer at a previous moment, and the second current viewing information including position information and binocular pupil distance information of the second viewer at the current moment;
    the processor, connected with the display panel and the liquid crystal grating; configured to receive the first current viewing information, the second previous viewing information and the second current viewing information sent by the image collector and store the first current viewing information, the second previous viewing information and the second current viewing information, adjust a width and/or a position of a light transmitting region of the liquid crystal grating according to the first current viewing information, determine a corresponding second previous viewpoint according to the second previous viewing information, determine a second current viewpoint corresponding to the second current viewing information, according to the second current viewing information and the width and/or the position of the light transmitting region of the liquid crystal grating adjusted, and adjust an output picture of the display panel so that a picture corresponding to the second previous viewpoint is output at a position of the second current viewpoint of the display panel,
    wherein the liquid crystal grating includes the light transmitting region and a non-light transmitting region.

2. The display device according to claim 1, wherein, the processor includes:
    a determining module, configured to determine a first current viewpoint corresponding to the first current viewing information;

a first control module, configured to determine a viewpoint interference region of the first viewer according to the first current viewpoint, adjust the width and/or the position of the light transmitting region of the liquid crystal grating according to the viewpoint interference region to move out the viewpoint interference region from a viewing position of the first viewer;

a second control module, configured to determine the corresponding second previous viewpoint according to the second previous viewing information, determine the second current viewpoint corresponding to the second current viewing information according to the width and/or the position of the light transmitting region of the liquid crystal grating adjusted, and adjust the output picture of the display panel so that the picture corresponding to the second previous viewpoint is output at a position of the second current viewpoint of the display panel.

3. The display device according to claim 2, wherein, the first control module includes:

a first acquiring unit, configured to read first previous viewing information, the first previous viewing information being viewing information of the first viewer at a previous moment, and determine a first previous viewpoint corresponding to the first previous viewing information;

a first determining unit, configured to compare the first current viewpoint with the first previous viewpoint, and determine the viewpoint interference region of the first viewer;

a first controller, configured to adjust the width and/or the position of the light transmitting region of the liquid crystal grating according to the first current viewing information and the viewpoint interference region to move out the viewpoint interference region from the viewing position of the first viewer.

4. The display device according to claim 3, wherein, the first controller includes:

a first sub-calculator, configured to obtain a center-to-center spacing between two adjacent light transmitting regions of the liquid crystal grating, according to the first current viewing information; calculate a width and/or a position of an ideal light transmitting region corresponding to the first current viewing information, according to the center-to-center spacing and the viewpoint interference region;

a first sub-controller, configured to adjust the width and/or the position of the light transmitting region of the liquid crystal grating according to the width and/or the position of the ideal light transmitting region to move out the viewpoint interference region from the viewing position of the first viewer.

5. The display device according to claim 2, wherein, the second control module includes:

a second acquiring unit, configured to read second previous viewing information, the second previous viewing information being viewing information of the second viewer at the previous moment, and determine the corresponding second previous viewpoint corresponding to the second previous viewing information;

a second determining unit, configured to determine the second current viewpoint corresponding to the second current viewing information, according to the second current viewing information and the width and/or the position of the light transmitting region of the liquid crystal grating adjusted;

a second controller, configured to adjust the output picture of the display panel, according to the second current viewpoint and the second previous viewpoint, and output the picture corresponding to the second previous viewpoint at a position of the second current viewpoint of the display panel.

6. The display device according to claim 1, wherein, the image collector includes:

an image collecting module, configured to collect face images of the first viewer and the second viewer;

an image processing module, configured to process the face images of the first viewer and the second viewer, to obtain the first current viewing information and the second current viewing information.

7. The display device according to claim 1, wherein, the image collecting module includes a camera module or a video camera module.

8. The display device according to claim 2, wherein, the determining module is configured to:

determine current position coordinates of the first viewer according to the first current viewer information;

determine a viewpoint corresponding to the current position coordinates of the first viewer by looking up a Table of Relationship between Position Coordinates and Viewpoints.

9. The display device according to claim 3, wherein, the first acquiring unit is configured to:

determine position coordinates of the first viewer at the previous moment according to the first previous viewing information;

determine a viewpoint corresponding to the position coordinates of the first viewer at the previous moment by looking up the Table of Relationship between Position Coordinates and Viewpoints.

10. The display device according to claim 8, further comprising:

a storing module, configured to store the Table of Relationship between Position Coordinates and Viewpoints.

11. A control method of a naked-eye three-dimensional display device, the naked-eye three-dimensional display device comprising a display panel, a liquid crystal grating, a processor and an image collector, the control method comprising:

obtaining, by the image collector, first current viewing information, second previous viewing information and second current viewing information, and sending the first current viewing information, the second previous viewing information and the second current viewing information to the processor; the first current viewing information including position information and binocular pupil distance information of a first viewer at a current moment, the second previous viewing information including position information and binocular pupil distance information of a second viewer at a previous moment, and the second current viewing information including position information and binocular pupil distance information of the second viewer at the current moment;

receiving, by the processor, the first current viewing information, the second previous viewing information and the second current viewing information sent by the image collector and storing the first current viewing information the second previous viewing information and the second current viewing information, adjusting a width and/or a position of a light transmitting region of the liquid crystal grating according to the first current viewing information, determining a corresponding second previous viewpoint according to the second previous viewing information, determining a second current viewpoint corresponding to the second current viewing information according to the second current viewing information and the width and/or the position of the light transmitting region of the liquid crystal grating adjusted and adjusting an output picture of the display panel so that a picture corresponding to the second previous viewpoint is output at a position of the second current viewpoint of the display panel, wherein the liquid crystal grating includes the light transmitting egion and a non-light transmitting region.

12. The control method according to claim 11, wherein, the adjusting a width and/or a position of a light transmitting region of the liquid crystal grating according to the first current viewing information, determining a corresponding second previous viewpoint according to the second previous viewing information, determining a second current viewpoint corresponding to the second current viewing information according to the second current viewing information and the width and/or the position of the light transmitting region of the liquid crystal grating adjusted and adjusting an output picture of the display panel so that a picture corresponding to the second previous viewpoint is output at a position of the second current viewpoint of the display panel, includes:

determining a first current viewpoint corresponding to the first current viewing information;

determining a viewpoint interference region of the first viewer according to the first current viewpoint, adjusting the width and/or the position of the light transmitting region of the liquid crystal grating according to the viewpoint interference region to locate the viewpoint interference region outside a viewing position of the first viewer;

determining the corresponding second previous viewpoint according to the second previous viewing information, determining the second current viewpoint corresponding to the second current viewing information according to the second current viewing information and the width and/or the position of the light transmitting region of the liquid crystal grating adjusted, adjusting an output picture of the display panel so that a picture corresponding to the second previous viewpoint is output at a position of the second current viewpoint of the display, panel.

13. The control method according to claim 12, wherein, the determining a viewpoint interference region of the first viewer according to the first current viewpoint, adjusting the width and/or the position of the light transmitting region of the liquid crystal grating according to the viewpoint interference region to locate the viewpoint interference region outside a viewing position of the first viewer, includes:

reading first previous viewing information, the first previous viewing information being viewing information of the first viewer at the previous moment, and determining a first previous viewpoint corresponding to the first previous viewing information;

comparing the first current viewpoint with the first previous viewpoint, and determining the viewpoint interference region of the first viewer;

adjusting the width and/or the position of the light transmitting region of the liquid crystal grating according to the first current viewing information and the viewpoint interference region to locate the viewpoint interference region outside a viewing position of the first viewer.

14. The control method according to claim 13, wherein, the adjusting the width and/or the position of the light transmitting region of the liquid crystal grating according to the first current viewing information and the viewpoint interference region to locate the viewpoint interference region outside a viewing position of the first viewer, includes:

obtaining a center-to-center spacing between two adjacent light transmitting regions of the liquid crystal grating, according to the first current viewing information;

calculating a width and/or a position of an ideal light transmitting region corresponding to the first current viewing information, according to the center-to-center spacing and the viewpoint interference region;

adjusting the width and/or the position of the light transmitting region of the liquid crystal grating according to the width and/or the position of the ideal light transmitting region to locate the viewpoint interference region outside a viewing position of the first viewer.

15. The control method according to claim 12, wherein, the determining the corresponding second previous viewpoint according to the second previous viewing information, the determining the second current viewpoint corresponding to the second current viewing information according to the second current viewing information and the width and/or the position of the light transmitting region of the liquid crystal grating adjusted, and the adjusting an output picture of the display panel so that a picture corresponding to the second previous viewpoint is output at a position of the second current viewpoint of the display panel, includes:

reading second previous viewing information, the second previous viewing information being viewing information of the second viewer at the previous moment, and determining the second previous viewpoint corresponding to the second previous viewing information;

determining the second current viewpoint corresponding to the second current viewing information, according to the second current viewing information and the width and/or the position of the light transmitting region of the liquid crystal grating adjusted;

adjusting the output picture of the display panel, according to the second current viewpoint and the second previous viewpoint, and outputting the picture corresponding to the second previous viewpoint at the position of the second current viewpoint of the display panel.

16. The control method according to claim 11, wherein, the obtaining, by the image collector, first current viewing information and second current viewing information, and sending the first current viewing information and the second current viewing information to the processor, includes:

collecting; by the image collector; face images of the first viewer and the second viewer, respectively;

processing the face images of the first viewer and the second viewer, respectively, to obtain the first current viewing information of the first viewer and the second current viewing information of the second viewer.

17. The control method according to claim 13, wherein, the determining a first current viewpoint corresponding to the first current viewing information, includes:

determining current position coordinates of the first viewer according to the first current viewer information;

determining a viewpoint corresponding to the current position coordinates of the first viewer by looking up a Table of Relationship between Position Coordinates and Viewpoints;

the determining a first previous viewpoint corresponding to the first previous viewing information, includes:
determining position coordinates of the first viewer at the previous moment according to the first previous viewing information;
determining a viewpoint corresponding to the position coordinates of the first viewer at the previous moment by looking up the Table of Relationship between Position Coordinates and Viewpoints.

* * * * *

UNITED STATES PATENT AND TRADEMARK OFFICE
CERTIFICATE OF CORRECTION

PATENT NO. : 10,887,584 B2  
APPLICATION NO. : 16/019957  
DATED : January 5, 2021  
INVENTOR(S) : Liang Zhang et al.

Page 1 of 1

It is certified that error appears in the above-identified patent and that said Letters Patent is hereby corrected as shown below:

On the Title Page

Item (73) Assignees should be corrected to read: BOE TECHNOLOGY GROUP CO., LTD. , Beijing (CN); BEIJING BOE OPTOELECTRONICS TECHNOLOGY CO, LTD., Beijing (CN)

Signed and Sealed this  
Twenty-fourth Day of August, 2021

Drew Hirshfeld  
*Performing the Functions and Duties of the*  
*Under Secretary of Commerce for Intellectual Property and*  
*Director of the United States Patent and Trademark Office*